US010855824B2

(12) United States Patent
Park et al.

(10) Patent No.: US 10,855,824 B2
(45) Date of Patent: Dec. 1, 2020

(54) IN-FOLDING HINGE STRUCTURE HAVING FLEXIBLE DISPLAY PANEL INSTALLED THEREON

(71) Applicant: AUFLEX CO., LTD., Hwaseong-si (KR)

(72) Inventors: Hyun Min Park, Seoul (KR); Seoung Jun Lee, Uiwang-si (KR)

(73) Assignee: AUFLEX CO., LTD., Hwaseong-si (KR)

( * ) Notice: Subject to any disclaimer, the term of this patent is extended or adjusted under 35 U.S.C. 154(b) by 0 days.

(21) Appl. No.: 16/340,815

(22) PCT Filed: Oct. 11, 2017

(86) PCT No.: PCT/KR2017/011205
§ 371 (c)(1),
(2) Date: Apr. 10, 2019

(87) PCT Pub. No.: WO2018/070782
PCT Pub. Date: Apr. 19, 2018

(65) Prior Publication Data
US 2019/0268456 A1 Aug. 29, 2019

(30) Foreign Application Priority Data

Oct. 11, 2016 (KR) .................. 10-2016-0131658
Sep. 5, 2017 (KR) .................. 10-2017-0113594

(51) Int. Cl.
*H04M 1/02* (2006.01)
*E05D 3/18* (2006.01)
(Continued)

(52) U.S. Cl.
CPC ............ *H04M 1/0268* (2013.01); *E05D 3/18* (2013.01); *E05D 5/06* (2013.01); *E05D 7/00* (2013.01);
(Continued)

(58) Field of Classification Search
CPC ..... H04M 1/0268; H04M 1/0216; E05D 3/18; E05D 5/06; E05D 7/00; E05Y 2900/606
See application file for complete search history.

(56) References Cited

U.S. PATENT DOCUMENTS 9,164,547 B1\* 10/2015 Kwon .................. G06F 1/1656
2012/0264489 A1\* 10/2012 Choi .................. H04M 1/0216
455/566

(Continued)

FOREIGN PATENT DOCUMENTS

KR 10-2011-28893 3/2011
KR 10-2014-0049911 4/2014
(Continued)

*Primary Examiner* — Nizar N Sivji
(74) *Attorney, Agent, or Firm* — Lex IP Meister, PLLC

(57) ABSTRACT

In a mobile communication terminal in which a flexible display panel is provided in two body portions which are foldably connected to each other, a plurality of rotation supports are provided in a central joint that connects the two body portions and two sliding panels sliding in the respective body portions together and the rotation supports are directly connected to the two body portions to support rotation of the body portions such that the body portions do not rotate over 180 degrees when the two body portions are fully unfolded, whereby damage of the flexible display panel provided on the surfaces of the two body portions is prevented.

3 Claims, 11 Drawing Sheets

(51) Int. Cl.
*E05D 5/06* (2006.01)
*E05D 7/00* (2006.01)
*G09F 9/30* (2006.01)
*G06F 1/16* (2006.01)

(52) U.S. Cl.
CPC .................. *G06F 1/16* (2013.01); *G09F 9/30* (2013.01); *H04M 1/0216* (2013.01); *E05Y 2900/606* (2013.01)

(56) References Cited

U.S. PATENT DOCUMENTS

| | | | | |
|---|---|---|---|---|
| 2014/0111954 | A1* | 4/2014 | Lee | G06F 1/1641 361/749 |
| 2015/0366089 | A1* | 12/2015 | Park | G06F 1/1641 361/679.01 |
| 2016/0205792 | A1* | 7/2016 | Ahn | H05K 5/0017 40/779 |
| 2016/0378203 | A1* | 12/2016 | Kim | G06F 1/1616 345/156 |
| 2017/0169741 | A1* | 6/2017 | Lim | G09F 9/00 |
| 2017/0192460 | A1* | 7/2017 | Watanabe | G09F 9/00 |
| 2017/0272559 | A1* | 9/2017 | Cavallaro | H04M 1/0268 |
| 2018/0110144 | A1* | 4/2018 | Wang | G06F 1/163 |
| 2018/0279489 | A1* | 9/2018 | Ochi | E05D 7/00 |

FOREIGN PATENT DOCUMENTS

| | | |
|---|---|---|
| KR | 10-2014-134503 | 11/2014 |
| KR | 10-2015-99676 | 9/2015 |
| KR | 10-2015-142290 | 12/2015 |
| KR | 10-2016-87972 | 7/2016 |
| KR | 10-2016-0087972 | 7/2016 |

* cited by examiner

IN-FOLDING HINGE STRUCTURE HAVING FLEXIBLE DISPLAY PANEL INSTALLED THEREON

TECHNICAL FIELD

The invention relates to an in-folding type hinge structure having a flexible display panel installed therein and, more particularly, to an in-folding type hinge structure having a flexible display panel installed therein in which a plurality of rotation supports are provided in a central joint that connects two body portions and two sliding panels sliding in the respective body portions together in a mobile communication terminal in which a flexible display panel is provided in the two body portions which are foldably connected to each other, and the rotation supports are directly connected to the two body portions to support rotation of the body portions such that the body portions do not rotate over 180 degrees when the two body portions are fully unfolded, whereby damage of the flexible display panel provided on the surfaces of the two body portions can be prevented.

BACKGROUND ART

In general, a display module in a mobile communication terminal displays information which is processed by the mobile communication terminal. For example, when the mobile communication terminal operates in a phone conversion mode, the display module displays a user interface (UI) or a graphic user interface (GUI) associated with a phone conversation.

The display module may be constituted by a liquid crystal display, an organic light-emitting diode, a flexible display, or the like.

A flexible display among these displays has been actively studied due to its merit that its shape can be freely deformed. Accordingly, there is necessity for description of usage and protection of a flexible display when the flexible display is used in a mobile communication terminal.

An example of a hinge structure for a mobile communication terminal having a flexible display panel installed therein is disclosed in Korean Patent Application Laid-open No. 10-2015-0096827 (Title of the Invention: HINGE STRUCTURE AND FOLDABLE DISPLAY DEVICE INCLUDING THE SAME).

SUMMARY OF THE INVENTION

Technical Problem

The invention provides an in-folding type hinge structure having a flexible display panel installed therein and more particularly provides an in-folding type hinge structure having a flexible display panel installed therein in which a plurality of rotation supports are provided in a central joint that connects two body portions and two sliding panels sliding in the respective body portions together and the rotation supports are directly connected to the two body portions to support rotation of the body portions such that the body portions do not rotate over 180 degrees when the two body portions are fully unfolded, whereby damage of the flexible display panel provided on the surfaces of the two body portions can be prevented.

Solution to Problem

In order to the achieve the above-mentioned objective, there is provided an in-folding type hinge structure having a flexible display panel installed therein, including:

a pair of body portions (10, 12) that face each other;

a central joint (50) that is disposed at the center between the body portions 910, 12) and is rotatably connected to the two body portions (10, 12);

a sliding panel (20) that is disposed in each of the two body portions (10, 12) to slide in each of the two body portions (10, 12); and a joint portion (40) that is provided in surfaces of the sliding panels (20) facing each other and has a structure in which a plurality of joints are connected, wherein the joint portions (40) are rotatably connected to the central joint (50), wherein two rotation supports (52) are rotatably disposed in each lateral side of the central joint (50), wherein a guide groove (53) which is a passage into which a rivet (54) is inserted and moves is formed in each rotation support, and wherein the rotation supports (52) are rotatably coupled to the central joint (50).

A flexible display panel (70) may be attached to front surfaces of the two body portions (10, 12) in a state in which the two body portions (10, 12) and the two sliding panels (20) are coupled to the central joint (50).

A gap providing portion (56) that forms a gap between the two body portions (10, 12) when the two body portions (10, 12) are fully unfolded may be formed at both ends of the central joint (50).

Lateral areas of the two body portions (10, 12) may have a small width and thus a bezel 74 may have a small width.

Advantageous Effects of the Invention

The invention can provide an in-folding type hinge structure having a flexible display panel installed therein and, more particularly, can provide an in-folding type hinge structure having a flexible display panel installed therein in which a plurality of rotation supports are provided in a central joint that connects two body portions and two sliding panels sliding in the respective body portions together and the rotation supports are directly connected to the two body portions to support rotation of the body portions such that the body portions do not rotate over 180 degrees when the two body portions are fully unfolded, whereby damage of the flexible display panel provided on the surfaces of the two body portions can be prevented.

REFERENCE SIGNS LIST

| 10, 12: Body portion | 17: Rivet fixing portion | 19: Guide groove |
|---|---|---|
| 20: Sliding panel | 22: Guide protrusion | 40: Polyarticular portion |
| 50: Central join | 52: Rotation support | 53: Guide groove |
| 54: Rivet | 56: Gap providing portion | 70: Flexible display panel |

EMBODIMENTS OF THE INVENTION

Figure 1:
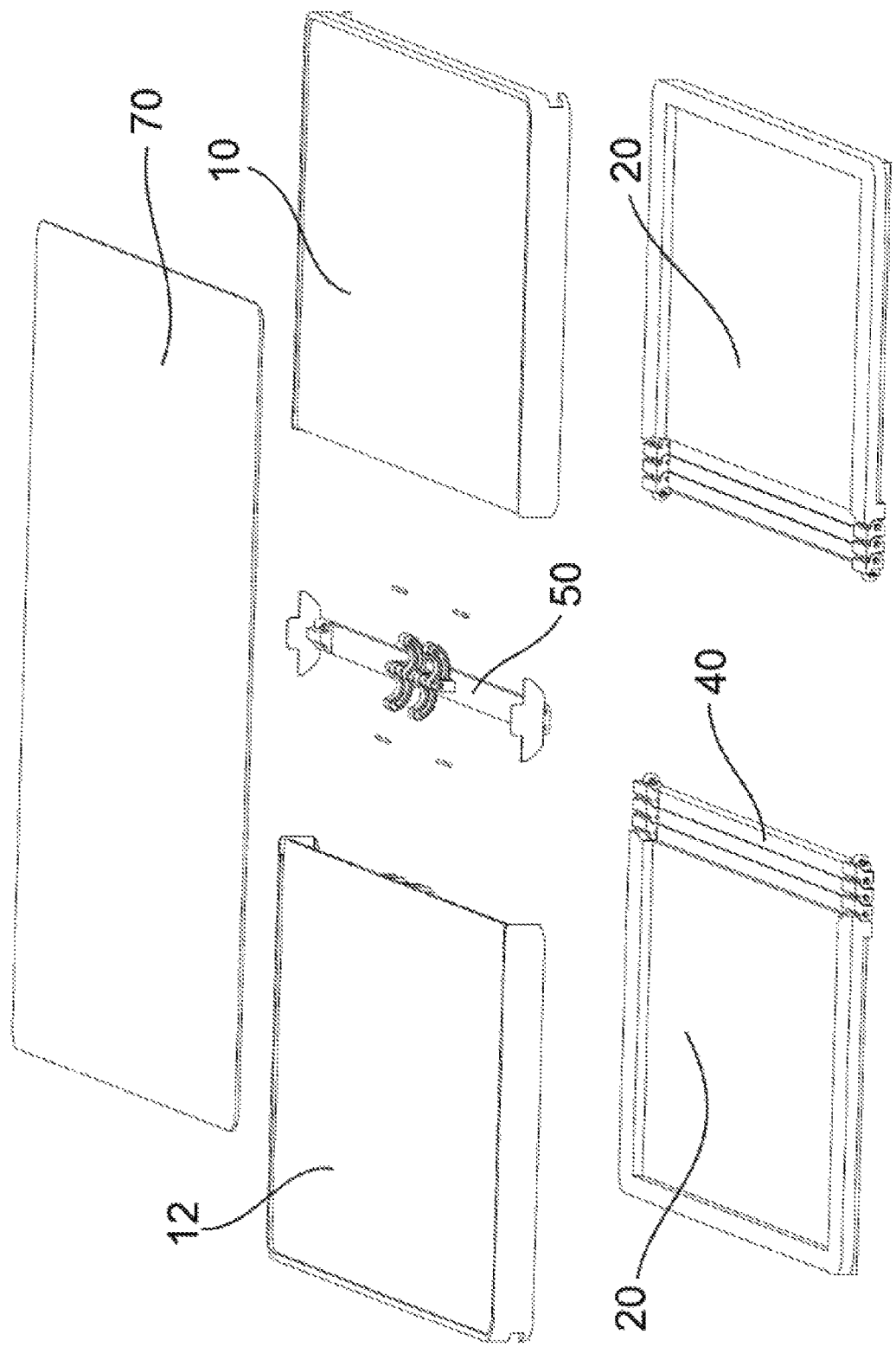
FIG. 1 is an exploded perspective view of an in-folding type hinge structure having a flexible display panel installed therein according to the invention.
Figure 2:
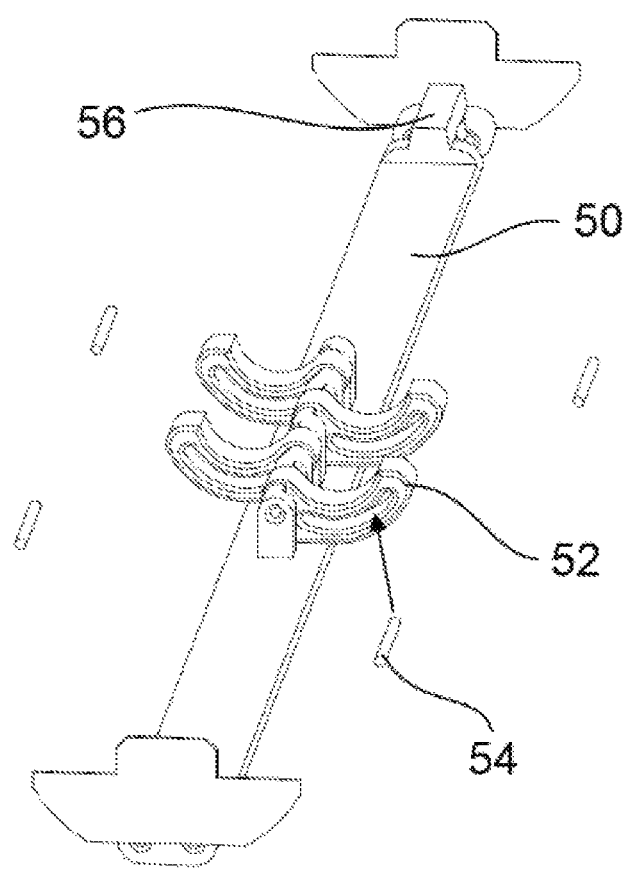
FIG. 2 is an exploded perspective view of a central joint illustrated in FIG. 1.

FIG. 1 is an exploded perspective view of an in-folding type hinge structure having a flexible display panel installed therein according to the invention. FIG. 2 is an exploded perspective view of a central joint illustrated in FIG. 1.

Referring to FIGS. 1 and 2, in an in-folding type hinge structure having a flexible display panel installed therein according to the invention, two body portions 10 and 12 opposing each other are provided, and a central joint 50 is provided between the body portions 10 and 12 and is rotatably connected to the two body portions 10 and 12.

Sliding panels 20 are provided in the two body portions 10 and 12 in the invention such that the sliding panels 20 can slide in the respective body portions 10 and 12.

A joint portion 40 in which a plurality of joints are connected to each other is provided on each of the opposing surfaces of the sliding panels 20, and the joint portions 40 are rotatably connected to the central joint 50.

Two rotation supports 52 are rotatably provided on each side of the central joint 50, and a guide groove 53 into which a rivet 54 is inserted and moves is formed in each rotation support 52.

The rotation supports 52 are rotatably coupled to the central joint 50.

A gap providing portion 56 that forms a gap between the two body portions 10 and 12 when the body portions 10 and 12 are fully folded is formed at both ends of the central joint 50.

A flexible display panel 70 according to the invention is attached to the surfaces of the two body portions 10 and 12 in a state in which the body portions 10 and 12 and the sliding panels 20 are all coupled to the central joint 50.

Figure 3:
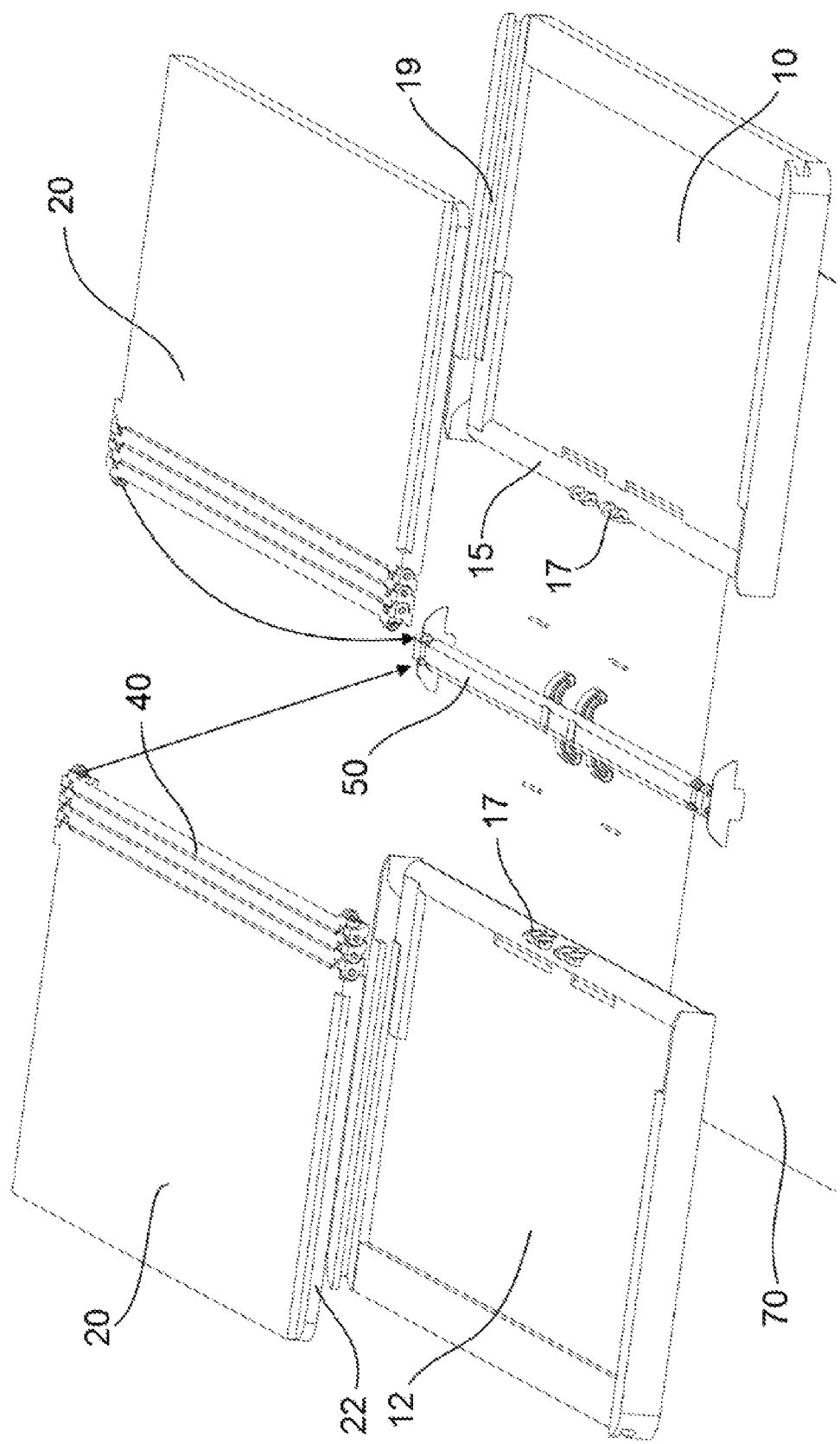
FIG. 3 is an exploded perspective view of a rear side of the in-folding type hinge structure having a flexible display panel installed therein according to the invention illustrated in FIG. 1.
Figure 4:
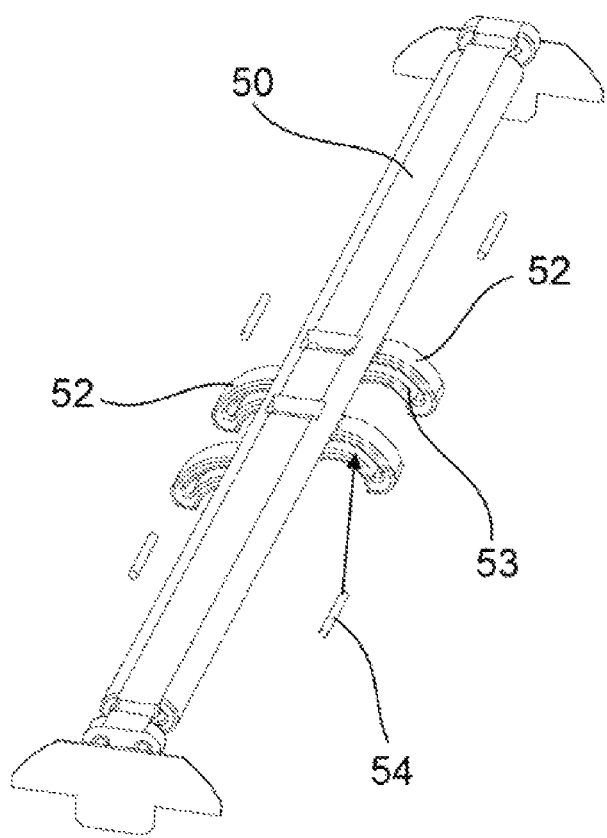
FIG. 4 is an exploded perspective view of the central joint illustrated in FIG. 3.

FIG. 3 is an exploded perspective view of a rear side of the in-folding type hinge structure having a flexible display panel installed therein according to the invention illustrated in FIG. 1. FIG. 4 is an exploded perspective view of the central joint illustrated in FIG. 3.

Referring to FIGS. 3 and 4, a guide protrusion 22 is formed on two opposing side surfaces of each sliding panel 20 according to the invention, and a guide groove 19 into which the corresponding guide protrusion 22 is inserted and moves is formed on the inner side surfaces of the two body portions 10 and 12.

A rounded contact surface 15 is formed on the opposing surfaces of the two body portions 10 and 12, and a rivet fixing portion 17 to which a rivet 54 inserted into the guide groove 53 of the rotation supports 52 is fixed is formed in the middle of the rounded contact surface 15.

Both ends of each joint portion 40 are rotatably coupled to both ends of the central joint 50. This coupling is indicated by an arrow. The other end of the joint portion 40 which is not indicated by an arrow is also rotatably coupled to the other end of the central joint 50.

The central joint 50 is rotatably coupled to the two body portions 10 and 12 and is also rotatably coupled to fronts of the joint portions 40 of the two sliding panels 20.

A stopping area having a slightly recessed shape in which ends of the rotation supports 52 according to the invention are received can be formed close to the contact surfaces 15 of the body portions 10 and 12. The stopping area may be required or may not be required depending on the shapes of the rotation supports 52 and the contact surfaces 15.

Figure 5:
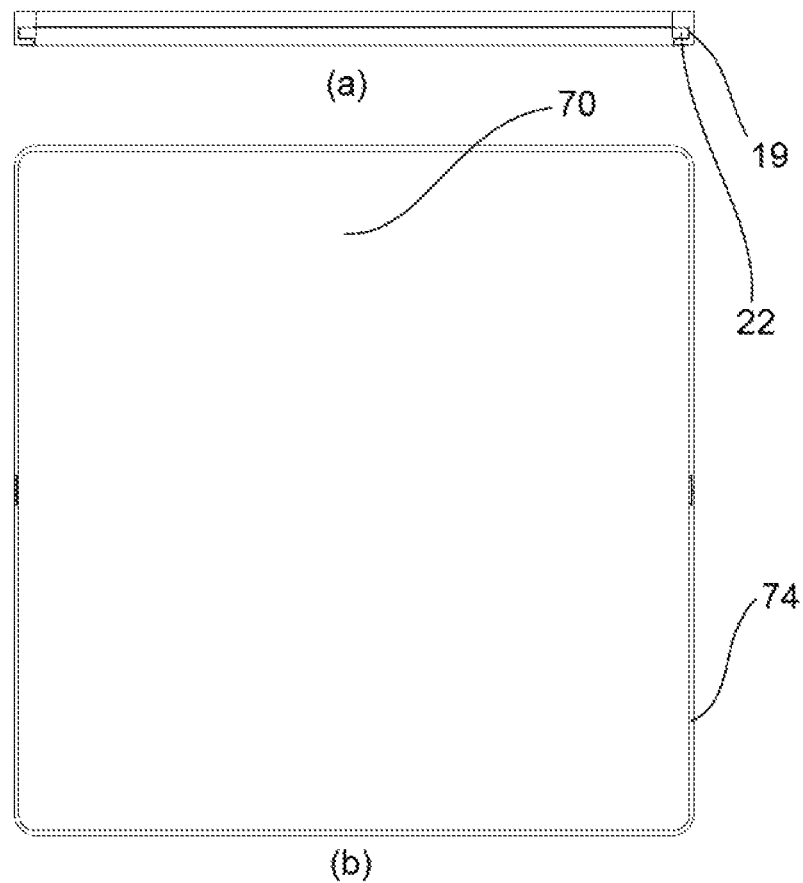
FIG. 5 is a plan view and a front view of the in-folding type hinge structure having a flexible display panel installed therein according to the invention.

FIG. 5 is a plan view and a front view of the in-folding type hinge structure having a flexible display panel installed therein according to the invention.

Referring to FIG. 5, when the flexible display panel 70 is installed in the in-folding type hinge structure having a flexible display panel installed therein according to the invention, a width of a bezel 74 can be reduced.

In the in-folding type hinge structure having a flexible display panel installed therein according to the invention, since the central joint 50 and the rotation supports 52 rotatably coupled to the central joint 50 support the two body portions 10 and 12, lateral areas of the body portions 10 and 12 do not need to be formed large and thus the width of the bezel 74 can be reduced.

Figure 6:
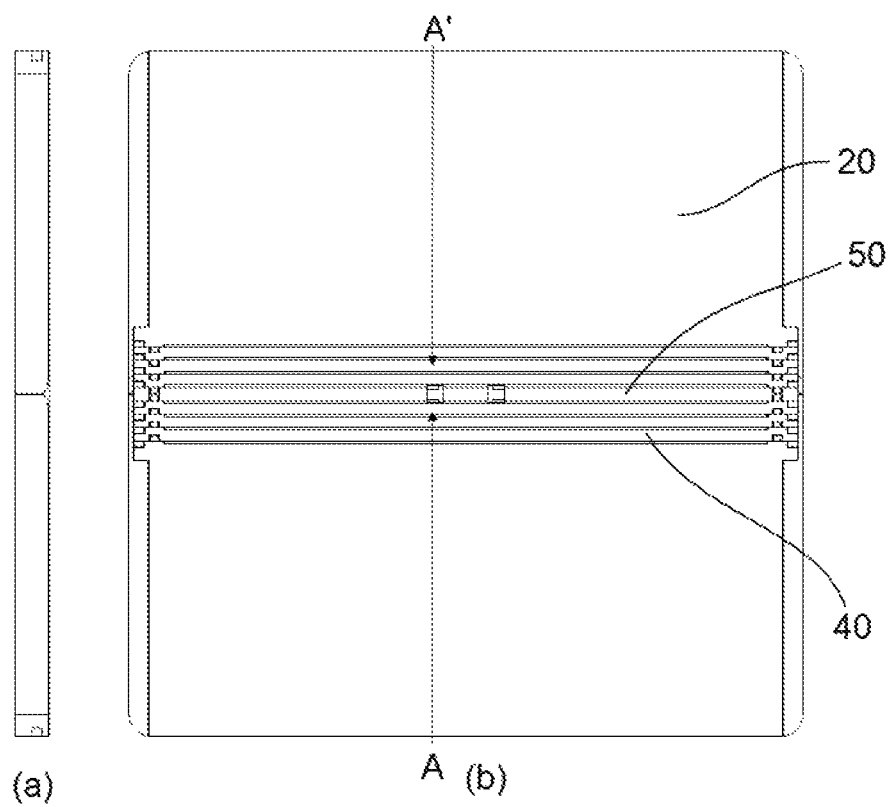
FIG. 6 is a rear view and a side view of the in-folding type hinge structure having a flexible display panel installed therein according to the invention.

FIG. 6 is a rear view and a side view of the in-folding type hinge structure having a flexible display panel installed therein according to the invention.

Referring to FIG. 6, the central joint 50 according to the invention is rotatably coupled to joints of the joint portion 40 that is connected to the two sliding panels 20.

The guide protrusions 22 of the sliding panels 20 according to the invention are inserted into the guide grooves 19 in the body portions 10 and 12 so as to move therein.

Figure 7:
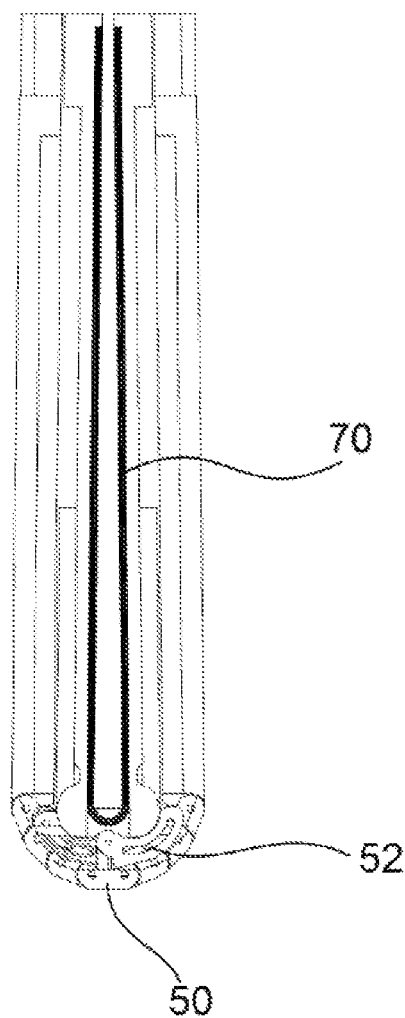
FIG. 7 is a sectional view taken along line A-A' in FIG. 6 in a state in which the in-folding type hinge structure having a flexible display panel installed therein according to the invention is folded.

FIG. 7 is a sectional view taken along line A-A' in FIG. 6 in a state in which the in-folding type hinge structure having a flexible display panel installed therein according to the invention is folded.

Referring to FIG. 7, in the state in which the two body portions 10 and 12 are fully folded, a gap with a predetermined length is formed in a folded part of the flexible display panel 70 due to the gap providing portion 56 formed in the central joint 50.

Figure 8:
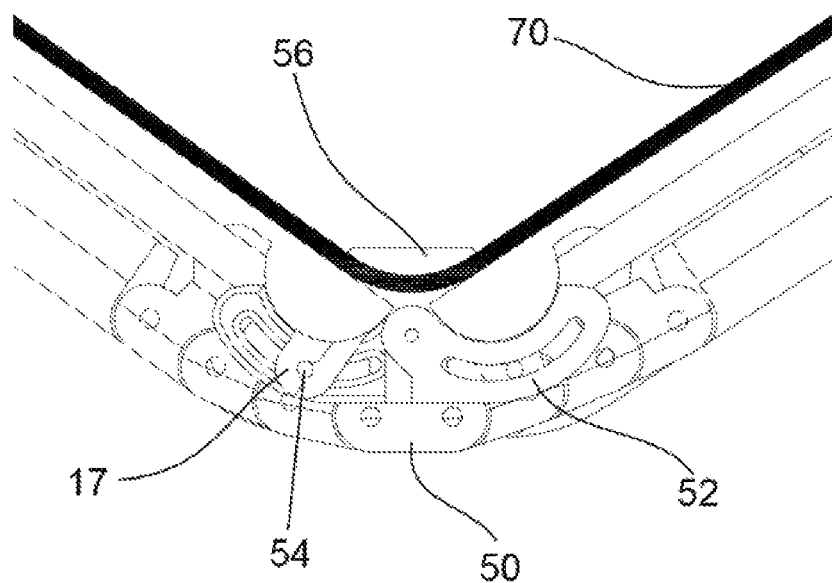
FIG. 8 is a sectional view of a joint portion taken along line A-A' in FIG. 6 in a state in which the in-folding type hinge structure having a flexible display panel installed therein according to the invention is being unfolded.

FIG. 8 is a sectional view of a joint portion taken along line A-A' in FIG. 6 in a state in which the in-folding type hinge structure having a flexible display panel installed therein according to the invention is being unfolded.

Referring to FIG. 8, the central joint 50 is rotatably connected to the joint portions 40, and the rotation supports 52 of the central joint 50 are rotated and supported along the guide grooves 53 of the rotation supports 52 by the rivet fixing portions 17 of the body portions 10 and 12 and the rivets 54.

In the state in which the two body portions 10 and 12 are fully folded, the surfaces of the two body portions 10 and 12 are not in close contact with each other but forms a gap with a predetermined length due to the gap providing portion 56 according to the invention.

Figure 9:
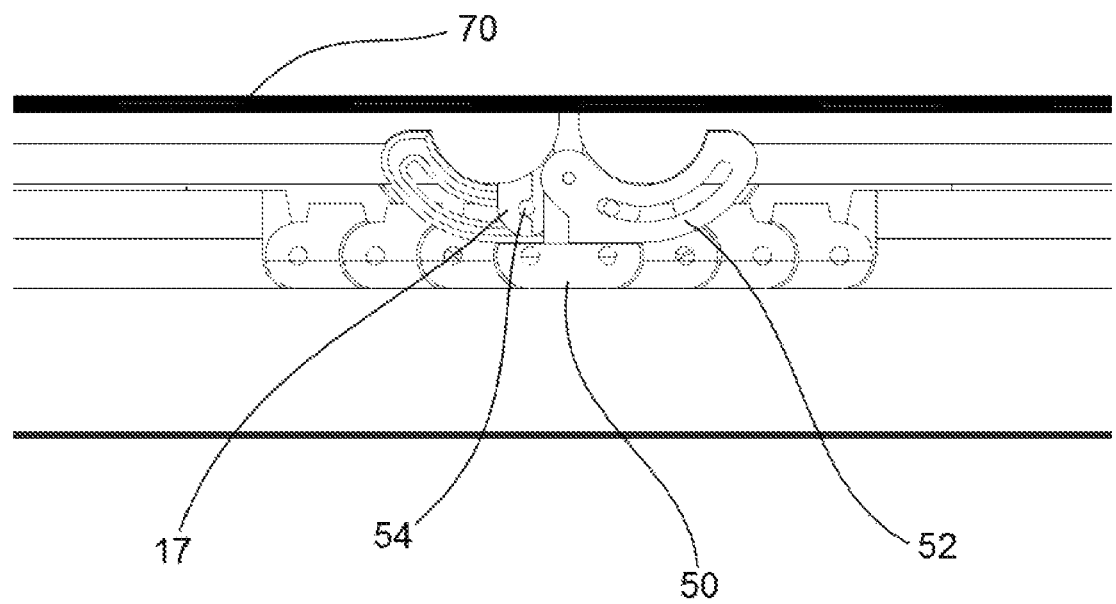
FIG. 9 is a sectional view of the joint portion taken along line A-A' in FIG. 6 in a state in which the in-folding type hinge structure having a flexible display panel installed therein according to the invention is fully unfolded.

FIG. 9 is a sectional view of the joint portion taken along line A-A' in FIG. 6 in a state in which the in-folding type hinge structure having a flexible display panel installed therein according to the invention is fully unfolded.

Referring to FIG. 9, the rotation supports 52 of the central joint 50 rotate in contact with the rounded contact surfaces 15 and the two body portions 10 and 12 are unfolded.

In the state in which the two body portions 10 and 12 are fully unfolded, the rotation supports 52 are in contact with the inner surfaces of the body portions 10 and 12 such that the body portions 10 and 12 is strongly prevented from rotating over 180 degrees, whereby it is possible to prevent damage of the flexible display panel 70.

Figure 10:
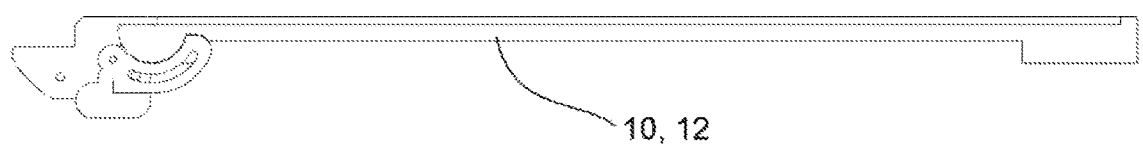
FIG. 10 is a sectional view of a central joint and one body portion taken along line A-A' in FIG. 6 in a state in which the in-folding type hinge structure having a flexible display panel installed therein according to the invention is fully unfolded.
Figure 11:
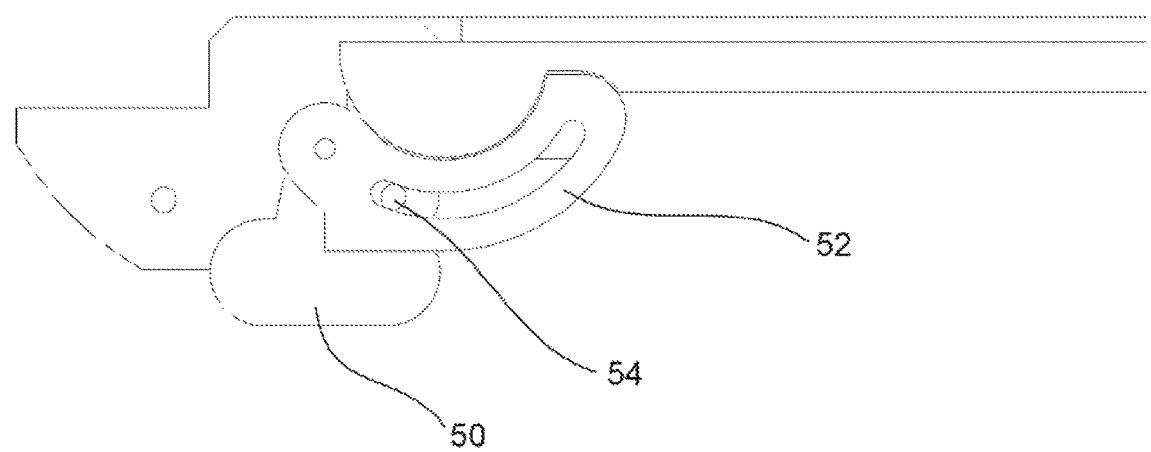
FIG. 11 is a partially enlarged sectional view of the central joint illustrated in FIG. 10.

FIG. 10 is a sectional view of a central joint and one body portion taken along line A-A' in FIG. 6 in a state in which the in-folding type hinge structure having a flexible display panel installed therein according to the invention is fully unfolded. FIG. 11 is a partially enlarged sectional view of the central joint illustrated in FIG. 10.

Referring to FIGS. 10 and 11, the central joint 50 and the rotation supports 52 according to the invention prevent the two body portions 10 and 12 from rotating out of a predetermined range.

Figure 12:
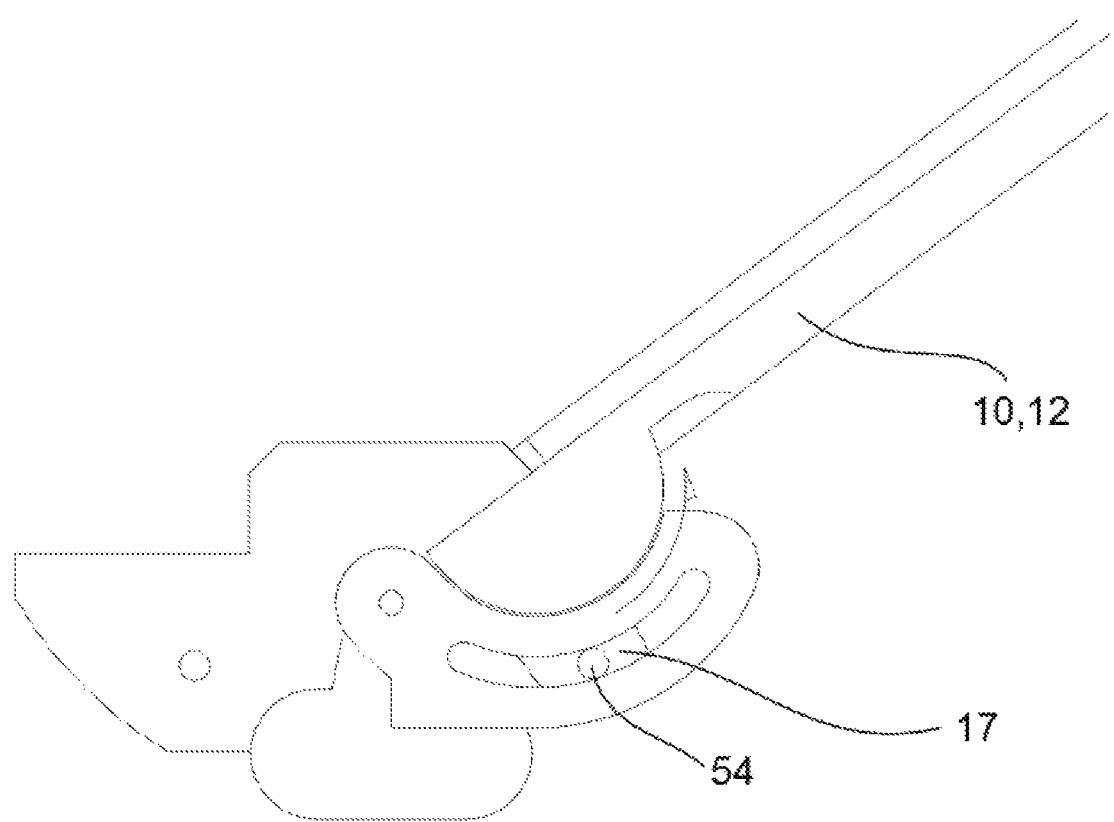
FIG. 12 is a sectional view of the central joint in a state in which one body portion is being folded according to the invention.
Figure 13:
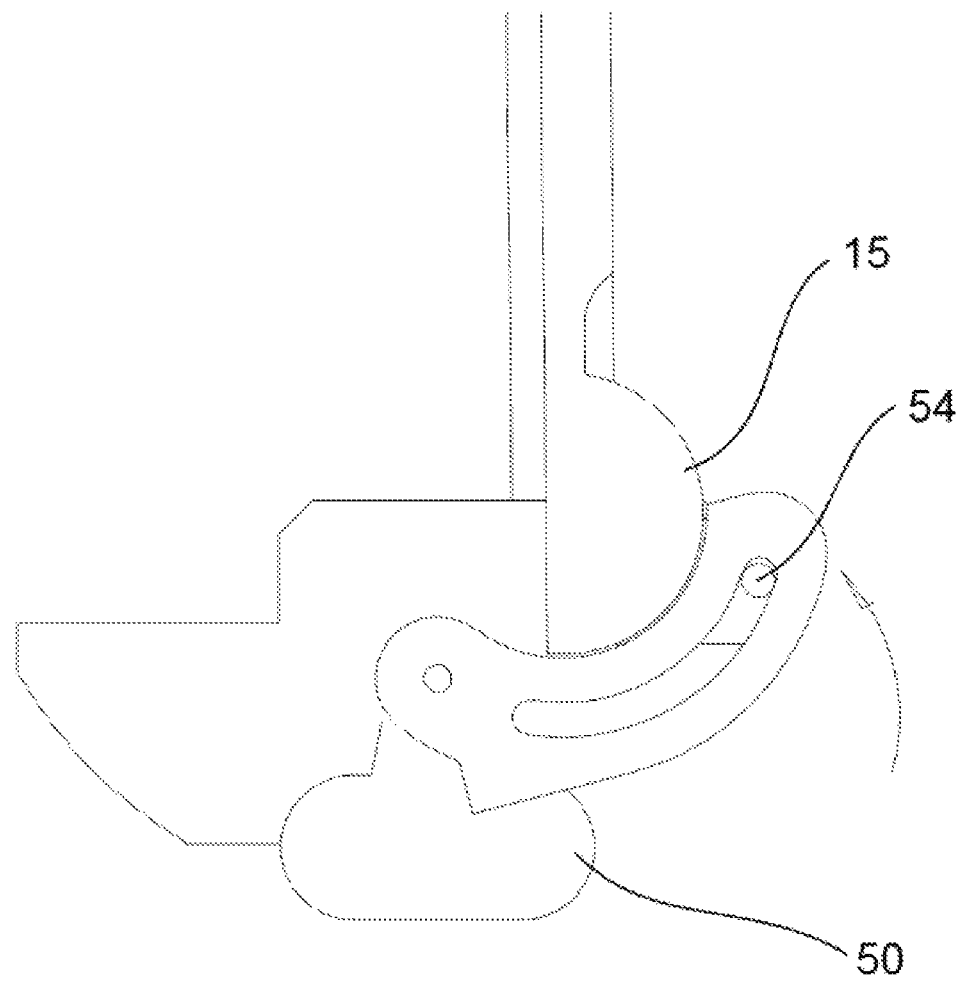
FIG. 13 is a sectional view of the central joint in a state in which one body portion is fully folded according to the invention.

FIG. 12 is a sectional view of the central joint in a state in which one body portion is being folded according to the invention. FIG. 13 is a sectional view of the central joint in a state in which one body portion is fully folded according to the invention.

Referring to FIGS. 12 and 13, while the two body portions 10 and 12 are rotating about the central joint 50, the rivet fixing portions 17 having the rivets 54 coupled thereto and the body portions 10 and 12 rotate along the guide grooves 53 of the rotation supports 52.

While an exemplary embodiment of the invention has been described above using specific terms, such description is only for explanation and it is obvious that the embodiment can be modified in various forms without departing from the technical spirit and scope of the appended claims. Such modified embodiments should not be understood separately from the spirit and scope of the invention and should belong to the appended claims.

The invention claimed is:

1. An in-folding type hinge structure having a flexible display panel installed therein, comprising:
   a pair of body portions (10, 12) that face each other;
   a central joint (50) that is disposed at the center between the body portions (10, 12);
   a sliding panel (20) that is disposed in each of the two body portions (10, 12) to slide in each of the two body portions (10, 12); and
   a joint portion (40) that is provided in surfaces of the sliding panels (20) facing each other and has a structure in which a plurality of joints are connected,
   wherein the joint portions (40) are rotatably connected to the central joint (50),
   wherein rotation supports (52) each having a rounded contact surface are rotatably disposed on upper side of the central joint (50),
   wherein the rotation supports (52) are rotatably coupled to the central joint (50), and
   wherein each of the body portions (10, 12) has a rounded contact surface (15) which is matched to the rounded contact surface of the rotation supports (52), and the rounded contact surface (15) of the body portions (10, 12) is always in contact with the rounded contact surface of the rotation supports (52) and rotates along the rounded contact surface of the rotation supports (52), and
   wherein the rounded contact surface (15) of the body portions (10, 12) and the rounded contact surface of the rotation supports (52) being in contact with each other have a same rotation center, thereby providing a rotation axis to the body portions (10, 12).

2. The in-folding type hinge structure having a flexible display panel installed therein according to claim 1, wherein a flexible display panel (70) is attached to front surfaces of the two body portions (10, 12) in a state in which the two body portions (10, 12) and the two sliding panels (20) are coupled to the central joint (50).

3. The in-folding type hinge structure having a flexible display panel installed therein according to claim 1, wherein a gap providing portion (56) that forms a gap between the two body portions (10, 12) when the two body portions (10, 12) are fully unfolded is formed at both ends of the central joint (50).

* * * * *